United States Patent Office 2,915,431
Patented Dec. 1, 1959

2,915,431

2-(2'-ISOPROPYL - 4' - CHLORO-5'-METHYL)-PHENOXYMETHYL-2-IMIDAZOLINE AND ITS PHARMACEUTICAL USES

Maurice Claude Ernest Carron and Alexandra Francine Jullien, Paris, France, assignors to Société Anonyme des Laboratoires Robert & Carriere, Paris, France No Drawing. Application July 17, 1956
Serial No. 598,265

5 Claims. (Cl. 167—52)

This invention relates to an imidazoline derivative, i.e. 2 - (2 - isopropyl-4'-chloro-5'-methyl)-phenoxymethyl-2-imidazoline, which may also be termed -chloro thymyl oxymethyl imidazoline, having the following formula:

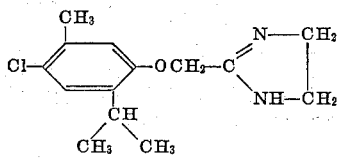

and characterized by interesting pharmacodynamic properties which make it suitable for therapeutic use. The product may be used in the form of its salts, for example the hydrochloride.

This compound has the following main pharmacodynamic properties:

(a) More powerful and lasting local anesthetic effect than that of cocaine;
(b) Antihistaminic action comparable with that of known medicaments, such as mepyramine;
(c) Very strong antiacetylcholinic action;
(d) Long-lasting vasoconstrictor action.

The combination of these four types of effects is quite remarkable, particularly in the symptomatic treatment of haemorrhoids. This compound is also convenient for treating dermatisis of allergitic character, insect punctures, etc. In all cases it is designed for local use in admixture with a suitable excipient.

It should be noted that:

Firstly, the extremely active compound may be used in moderate proportions. When the appropriate useful proportions are used neither local or general toxic effects nor irritating effects are observed.

Secondly, the compound action is long-lasting, which constitutes a substantial advantage as far as the convenience of use is concerned.

This product may be prepared according to any of the different methods known in the amidazoline series and a few examples of processes suitable for preparing this active principle in view of obtaining any pharmaceutical compositions intended for local applications are given hereafter.

*Example 1.—Condensation of 6-chlorothymol with 2-chloromethyl imidazoline*

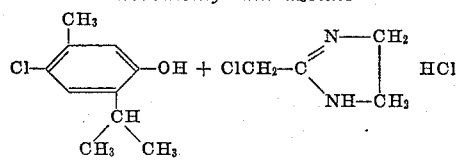

To a solution of 1.53 grams of sodium in 100 cc. of absolute ethanol there is added 5.15 grams of 6-chlorothymol followed by 5.2 grams of 2-chloromethyl imidazoline hydrochloride [a product of which the preparation method is well known to specialists; cf. Klarer-Urech, Helvetica Chimica Acta (1944), 27, p. 1762].

This solution is heated under reflux conditions during two hours and then the resulting sodium chloride is separated and the solvent evaporated. The residue is recovered in 50 cc. of water containing 25 cc. of 5% sodium hydroxide and an extraction is carried out twice with ether. The ether solutions are subsequently washed in water and dried over dessicated sodium sulfate. After filtration a solution of hydrochloric gas in ether is added to the liquid until the precipitation is completed. The separated product is filtered off and washed with ether. Thus, 4.5 grams of a pasty substance are obtained and recrystallized in an alcohol-acetone mixture (1–2) to obtain 1 gram of pure product. By adding one volume of ether to the filtrate another crystallization will occur. The total yield of hydrochloride of 2-[2'-isopropyl-4'-chloro-5'-methyl] phenoxymethyl-2-imidazoline is 2.85 grams; the M.P. is 455° F.

*Example 2.—The iminoester method*

The chloroacetamide prepared according to the Organic Syntheses (collective vol. I, French edition, p. 203), is converted into chloroacetonitrile according to Chi and Tschin [J. Am. Ch. Soc. (1942), 64, p. 91] then into 6-chlorothymyl oxy-acetonitrile

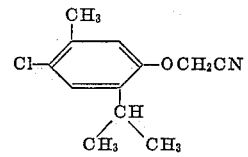

through the process disclosed by Djerassi and Scholz [J. Am. Ch. Soc. (1947), 67, p. 1688] for aryl-oxy acetonitriles in general. The fresh ether nitrile thus obtained has a B.P. located between 330 and 338° F. under 13 mm. Hg. Yield is 84%.

The ether nitrile is then converted into hydrochloride of imino chlorothymyl oxy ethyl-acetate

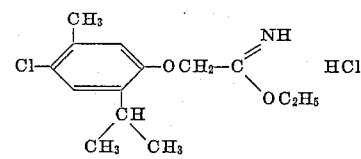

as follows:

9.8 grams of absolute ether are added to a solution of 45 grams of the aforesaid ether nitrile in 150 cc. of dry chloroform. Through the mixture cooled in a salted-ice medium there is passed a stream of dry hydrochloride gas until 8 grams have been absorbed. The solution is allowed to rest overnight in the ice chamber and then the major portion of the solvent is evaporated under reduced pressure and temperature conditions. Then 150 grams of dry ether are added to the residue to precipitate the iminoester in crystalline form. After drying and washing with ether the product is finally dried in a vacuum drier over phosphorous anhydride. Yield is 81% and M.P. 284° F.

Finally, this last substance is converted into hydrochloride of chlorothymyloxy methyl imidazoline:

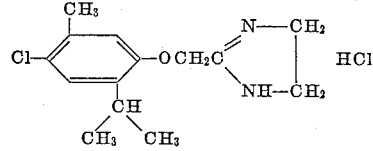

To this end, the following procedure is adhered to:
9.8 grams of anhydrous ethylene diamine are added to a mixture of 50 grams of the aforesaid iminoester and 150 grams of absolute ethanol, then the whole is heated under reflux conditions during 7½ hours. Then a light precipitate of ethylene diamine hydrochloride is filtered off. After allowing the mixture to rest 15 hours at 32° F. the alcohol is evaporated and the pasty residue triturated with 100 cc. of dry ether. The raw product separated by centrifugation may be purified by boiling to dissolve same in 200 cc. of a mixture consisting of absolute ethanol and methyl ethyl ketone (1–2). The crystals having slowly separated by cooling are dried, washed with a moderate quantity of firstly methyl ethyl ketone and then ether, and finally dried in vacuo over phosphorous anhydride.

The yield is 21 grs. and M.P. 455° F.

The therapeutic use of chlorothymyl oxymethyl imidazoline may be effected in the form of jelly or pomade.

*Example 3*

8 grams of carboxymethyl cellulose in powder form are mixed with 20 grams of propylene glycol. Then a solution is added slowly while stirring; this solution consists of 1 gram of chlorothymyl oxymethyl imidazoline hydrochloride dissolved in 170 cc. of water containing 0.08 gr. of propyl parahydroxybenzoate added as a preservative. The mixture is heated in a water-bath while heating constantly during about one hour, thereby producing a homogeneous jelly of which the weight is completed to 200 grams by adding a sufficient amount of lukewarm water. This jelly is suitable for therapeutic use.

*Example 4*

50 grams of glycol stearate are allowed to melt in a water-bath, then 20 grams of propylene glycol are added therein. In the adequately homogeneous mixture thus obtained there is added slowly while stirring through mechanical means a solution prepared by dissolving 1 gr. of chlorothymyl oxymethyl imidazoline hydrochloride in 129 cc. of water containing 0.07 gr. of propyl parahydrobenzoate added as a preservative and brought to a temperature of 122° F. Thus, a cream suitable for therapeutic use is obtained.

What we claim is:

1. A pharmaceutical product containing as an active agent 2-(2'-isopropyl-4'-chloro-5'-methyl-phenoxymethyl-2-imidazoline having the following formula:

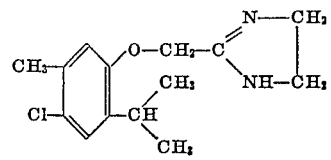

2. A pharmaceutical product containing as an active agent the hydrochloride of 2-(2'-isopropyl-4'-chloro-5'-methyl)-phenoxymethyl-2-imidazoline.

3. A pharmaceutical product consisting essentially of the hydrochloride of 2-(2'-isopropyl-4'-chloro-5'-methyl)-phenoxymethyl-2-imidazoline and an inert carrier.

4. A pharmaceutical product consisting essentially of a topical ointment in the form of a jelly containing 0.5% of hydrochloride of 2-(2'-isopropyl-4'-chloro-5'-methyl)-phenoxymethyl-2-imidazoline.

5. A pharmaceutical product consisting essentially of a topical ointment in the form of a cream containing 0.5% of hydrochloride of 2-(2'-isopropyl-4'-chloro-5'-methyl)-phenoxymethyl-2-imidazoline.

References Cited in the file of this patent

UNITED STATES PATENTS 2,149,473    Sonn _____ Mar. 7, 1939

OTHER REFERENCES

Barlow: "Introduction to Chemical Pharmacology," John Wiley, N.Y.C., 1955, pp. 288–289.